Figure 1:
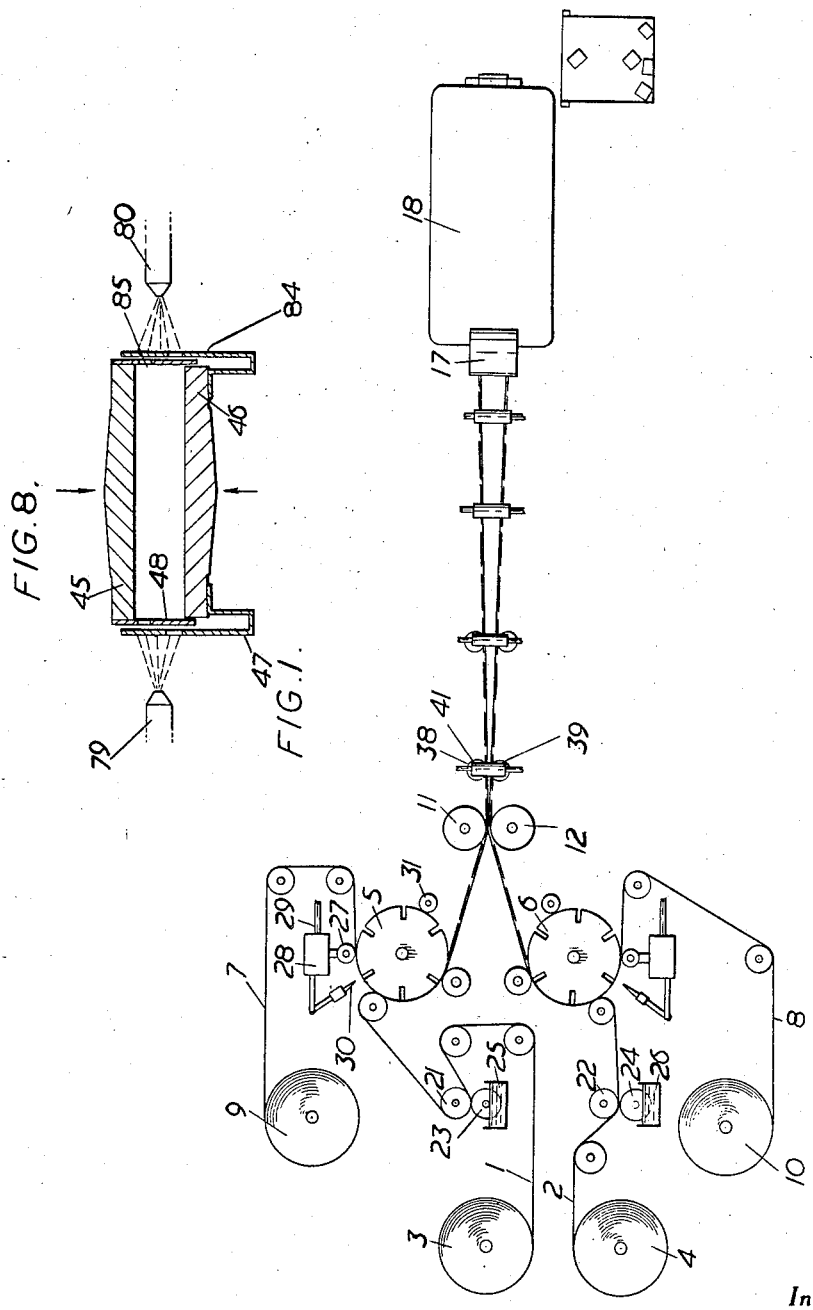

April 21, 1959     TZU EN SHEN     2,882,586
METHOD OF MANUFACTURING ELECTRIC CAPACITORS
Filed Aug. 23, 1954     5 Sheets-Sheet 2

Inventor
Tzu En Shen
By
Richard Lovell Cleaver, Attorney

April 21, 1959  TZU EN SHEN  2,882,586
METHOD OF MANUFACTURING ELECTRIC CAPACITORS
Filed Aug. 23, 1954  5 Sheets-Sheet 3

Inventor
Tzu En Shen
By
Richard Lovell Chaver, Attorney

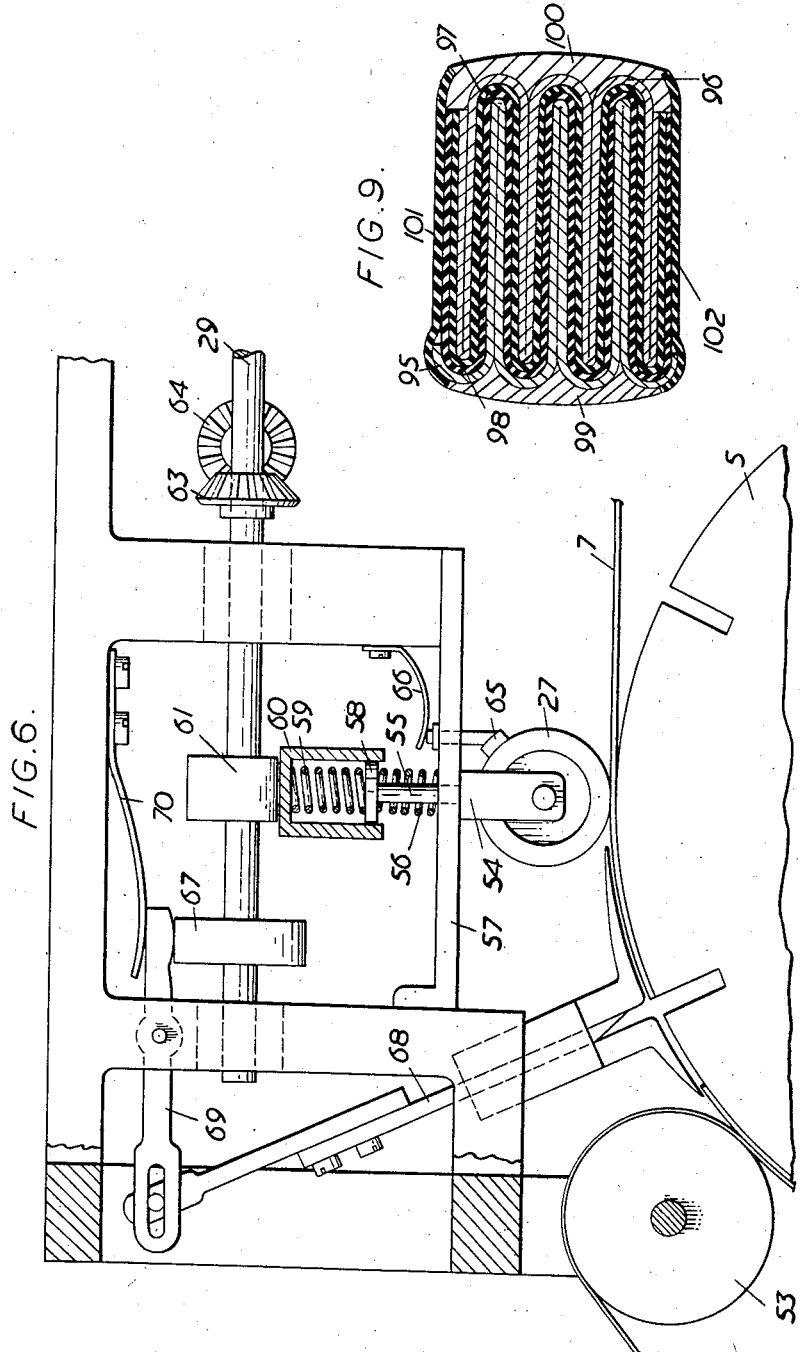

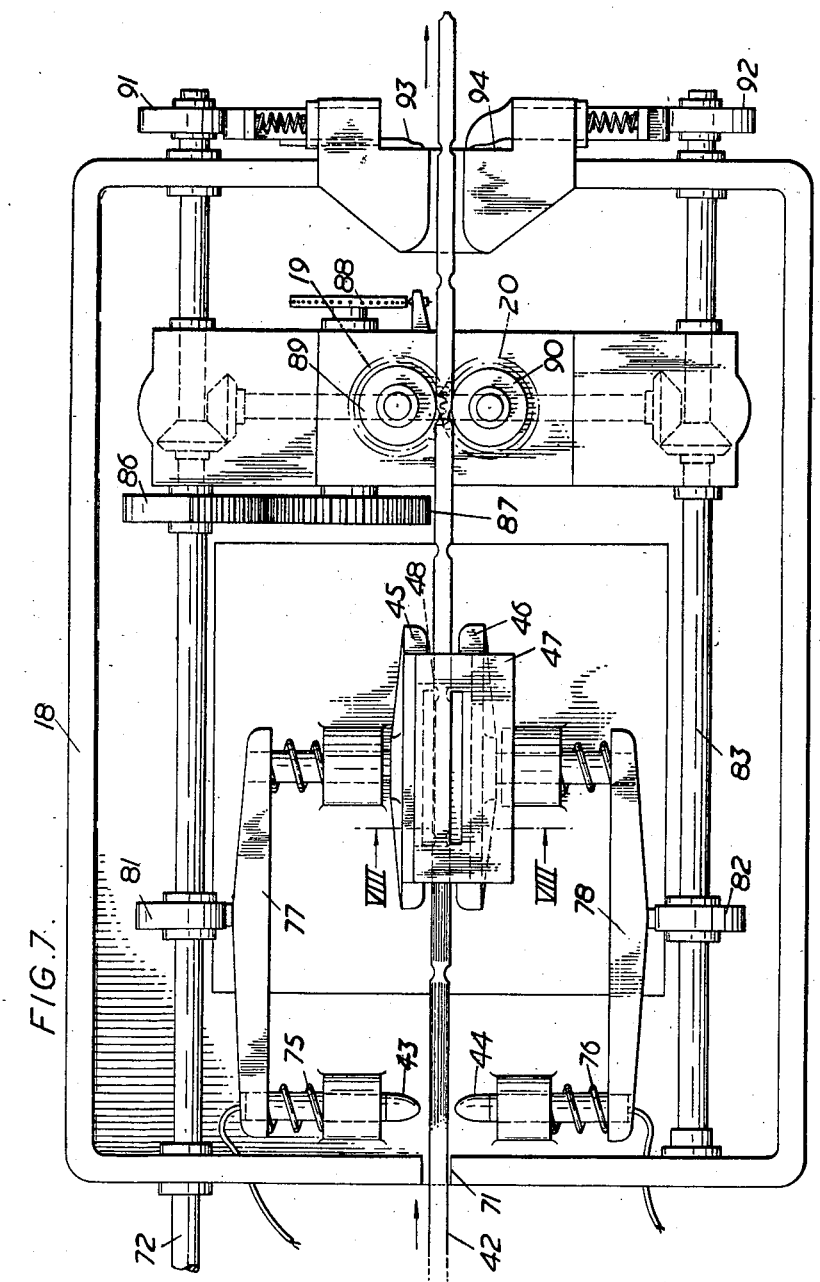

United States Patent Office 2,882,586
Patented Apr. 21, 1959

2,882,586

METHOD OF MANUFACTURING ELECTRIC CAPACITORS

Tzu En Shen, London, England, assignor to British Dielectric Research Limited, London, England, a British company Application August 23, 1954, Serial No. 451,513

Claims priority, application Great Britain August 24, 1953

11 Claims. (Cl. 29—25.42)

This invention relates to the manufacture of capacitors which have the form of a strip of dielectric material, serving as a carrier for or interleaved with a conductive layer and folded in a zig zag pattern and held therein. Capacitors of this kind are the subject of our copending application Serial No. 385,855. The invention provides a method of manufacture of such capacitors applicable for production in large quantity. The method comprises the steps of taking a long strip of substantial width, folding it along parallel longitudinal lines to a zig zag in cross section, thereby producing a long narrow strip of folded material, dividing this strip by transverse cuts into short lengths, securing the ends of these lengths in such as way as to maintain permanently the folded condition and applying terminal connections to the sides of each length. The steps of securing the ends and applying the terminals may each be done either before or after the cutting of the strip into short lengths.

In mechanising the method for quantity production, it may be arranged that the folding and cutting into lengths is done in one machine and the other steps are carried out by hand or mechanically on the cut pieces separately or in groups. Alternatively the folding can be done in one machine or in one machine section, followed by another machine or section which carries out the remaining steps. In the latter case the cutting into short pieces can, with advantage, be made the last step.

The initial material in the form of a long continuous strip will be led through a series of guides, either fixed or moving, which gradually change it from its full width to its final narrow condensed state by imparting the longitudinal folds to it.

When more strips than one are to be folded with interleaving they will be assembled in super-position before folding and will be folded simultaneously.

The two electrodes of the capacitor may be formed of two layers on opposite sides of a single strip of dielectric material, or may be layers on separate carrier strips assembled with their surfaces not carrying the conductive layers in contact with each other. One or more further strips of dielectric material may be arranged between the strips carrying the electrodes.

Each conductive layer which may be, for instance, metallisation on the strip material or foil carried by it, is preferably provided in portions separated by transverse gaps which are located in the positions where the cutting of the condensed strip will take place after folding. With this disposition of the conductive layers the cutting of the strip and the securing of the cut surfaces can be done without short-circuiting the several portions of the two conductive layers which form the separate electrodes.

In addition to the separation of the conductive layers into portions by transverse gaps, it is preferable also to provide longitudinal gaps in the form of narrow bands each of which is placed in a region which will lie immediately adjacent and include a fold and be on the inner surface thereof. The reason for this is that the folding and later processing of thin dielectric material is liable to weaken it so that if there is conductive material on each of its surfaces at a fold short-circuiting may occur. By removing the metal on one surface before folding this is prevented. The inside surface is chosen because the conductive material on the outside may play a part in the forming of the terminal connections.

The cut ends of the sections of the strip may be secured by the production of adhesion between the folds while these are held under pressure, or they may be held by riveting or clamping. Adhesion is preferably obtained by a heat sealing process. For this to be practicable the dielectric strips must be "heat-sealable" that is they must either be of a thermoplastic material, e.g. polystyrene, which softens and becomes adhesive on heating or they must have a coating of a material of this nature, e.g. paper strips coated or impregnated with polystyrene can be used. The terminal connections may be made by applying metal, as by spraying, to the outer edges of the folds.

Figure 2:
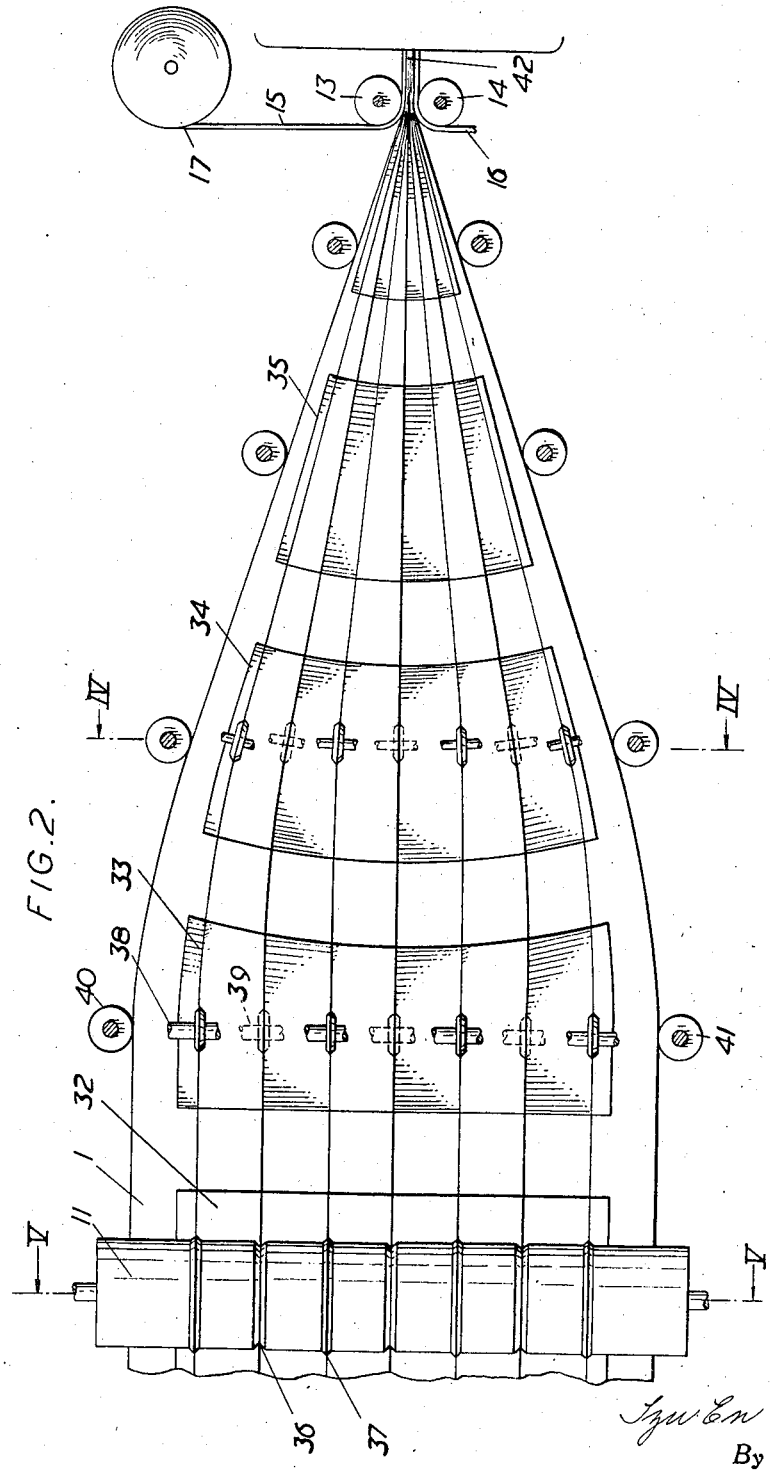
Figure 3:
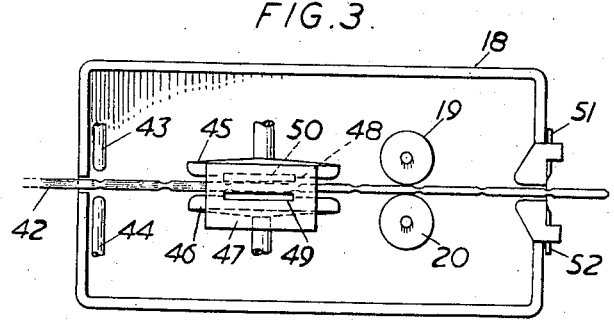
Figure 4:
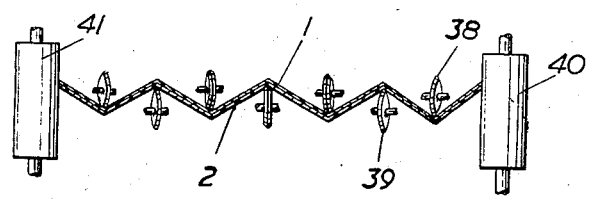
Figure 5:
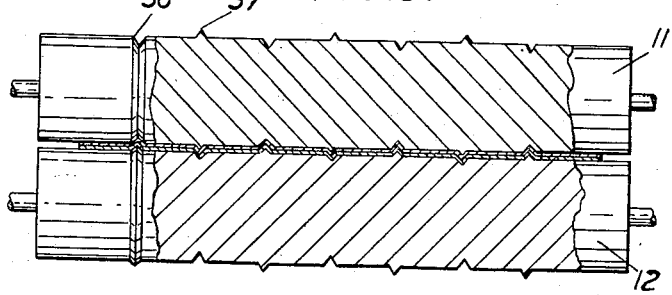

A method of manufacturing capacitors in accordance with the invention will be described by way of example with reference to the accompanying diagrammatic drawings, in which Figure 1 is an elevation of the whole apparatus for carrying out the method; Figures 2 and 3 are plans of two parts of the apparatus shown in Figure 1; Figures 4 and 5 are cross-sections on lines IV—IV and V—V in Figure 2; Figure 6 is an elevation, partly in cross-section, of another part of the apparatus; Figure 7 is a plan of a further part of the apparatus; Figure 8 is a cross-section on line VIII—VIII in Figure 7 and Figure 9 is a cross-section of a finished capacitor.

In this method the capacitor dielectric consists of two strips of polystyrene of substantial width and the electrodes consist of strips of metal foil.

Referring to Figure 1, the two strips of dielectric 1 and 2 pass from supply rolls 3 and 4 over slotted rollers 5 and 6. At the same time metal foil strips 7 and 8 slightly narrower in width than the dielectric strips pass from supply rolls 9 and 10 on to the slotted rollers 5 and 6 where they are cut into short lengths and applied to the surfaces of the dielectric strips 1 and 2, by a method which will be described later in greater detail.

From the slotted rollers 5 and 6 the dielectric strips carrying the strips of metal foil pass between scoring rollers 11 and 12. The rollers 5 and 6 are symmetrically arranged with respect to the rollers 11 and 12 so that the strips of metal foil register when the dielectric strips come into contact. From the rollers 11 and 12 the composite strip passes through apparatus for zig zag folding, shown in greater detail in Figure 2, to two rollers 13 and 14 (Figure 2) where cover strips 15 and 16 are applied to both sides of the condensed composite strip. The cover strip 15 is taken from a supply roll 17.

The condensed strip then passes through apparatus contained in the enclosure 18 (Figures 1 and 3) where it is heat sealed, supplied with terminals and cut into capacitor lengths. Also the enclosure 18 contains driving rollers 19 and 20 which drive the dielectric strips intermittently through the whole apparatus, that is to say, the dielectric strips are driven forward at intervals through a distance equal to the length of one capacitor.

The various parts of the apparatus referred to above will now be described in greater detail, starting from the supply end. In their passage from the supply rolls 3 and 4 the dielectric strips pass over a number of guide rollers. Of these the guide rollers 21 and 22 press the dielectric strip into contact with rollers 23 and 24 which are partly immersed in baths 25 and 26 containing molten petroleum jelly. By this means a thin coating of petroleum jelly is applied to a surface of each of the two strips, this being the surface which is brought into contact with the slotted rollers 5 and 6. The slotted rollers 5 and 6 are freely mounted and are intermittently driven by the dielectric strip as it is drawn forward through the apparatus. The circumferential distance between adjacent slots on the slotted rollers is equal to the length of one capacitor.

Referring only to the upper slotted roller 5, the metal foil 7 passes on to the slotted roller beneath a rubber roller 27 which holds the foil 7 in contact with the slotted roller 5. In the enclosure 28 there is a cam arrangement on the shaft 29 which shaft is coupled to the driving means for the main driving rollers 19 and 20. By this cam arrangement increased pressure is applied to the rubber roller 27 during the whole of each forward movement of the strip through the apparatus, except for a short interval at the beginning of this movement. When this increased pressure is applied the metal foil 7 is driven forward with the slotted roller 5. On completion of this movement the cam arrangement causes the knife blade 30 to move downwards into one of the slots in the slotted roller 5 and cut the metal foil. When the slotted roller 5 again commences to move, during the first part of the movement the foil will not move forward but will be only lightly held against the slotted disc by the roller 27. Thus there will be gaps between the strips of metal foil applied to the surface of the roller 5.

The strips of metal foil pass under the dielectric strip 1 on the roller 5 and are caused to adhere to the dielectric strip as it leaves the slotted roller 5 by the thin coating of petroleum jelly on the strip. Excess petroleum jelly which is deposited on the surface of the grooved roller 5 from the dielectric strip 1 is removed by a wiping roller 31.

Referring now to Figure 2, the dielectric strip 1 carrying metal foil strips such as 32, 33, 34 and 35 next passes between the two scoring rollers 11 and 12 (which are shown in cross-section in Figure 5). Each roller is provided with alternate V-shaped grooves 36 and V-shaped ribs 37. For the sake of clarity the size of these ribs and grooves is exaggerated in the drawings; in fact the ribs and grooves are only sufficiently large to score the dielectric strips 1 and 2 as they pass between the rollers.

The scored dielectric strips now pass over a series of folding discs 38 and 39 and a series of vertical rollers 40 and 41 by means of which zig zag folds are applied to the composite strip, consisting of the two dielectric strips 1 and 2 carrying on their exposed surfaces the metal foil strips which will form the electrodes of the capacitor.

The zig zag folded composite strip is finally condensed between the two rollers 13 and 14 which also serve to apply the narrow cover strips 15 and 16 of thermoplastic material such as polystyrene to the condensed strip.

The condensed strip, which will hereinafter be given the reference 42, now passes into the enclosure 18 (Figure 3). Whenever the strip is stationary two heated sealing bars 43 and 44 are pressed into contact with it to seal the folds in the dielectric together. These sealing bars are so positioned that they make contact with the condensed strip in the region of the gaps between the metal foil strips.

The condensed strip then passes between two pressure plates 45 and 46 which are moved together towards the strip at intervals to hold it firmly between them while it is stationary. The pressure plate 46 carries a screen 47 and the pressure plate 45 carries a similar screen 48 which is arranged beneath the screen 47. These two screens are formed with slots 49 and 50 which coincide when the pressure plates 45 and 46 move together to expose a length of the composite strip 42, equal to the length of a capacitor. A similar pair of screens is mounted on the pressure plates 45 and 46 on the opposite side of the condensed strip and above each pair of screens there is a metal spray gun which applies metal terminals to the edge of the composite strip 42 during the time that the composite strip 42 is stationary and the slots in the screens coincide. Wiping means may be provided for the removal of accumulated metal from the screens.

The driving rollers 19 and 20 have already been referred to. The means for driving these rollers is coupled with the means for moving the heating electrodes 43 and 44 and for moving the pressure plates 45 and 46. The same driving means also operates two knife blades 51, 52 which move together to cut the condensed strip 42 into capacitor lengths while it is stationary.

Referring now to Figure 6, here the arrangement for applying metal foil strips to the slotted roller 5 is shown in greater detail. The dielectric strip 1 passes on to the slotted roller 5 over a guide roller 53 and the metal foil 7 passes on to the slotted roller 5 under the rubber roller 27.

The rubber roller 27 is carried on a frame 54 supported by two spindles 55, only one of which can be seen. The spindles 55 are biased downwards, to apply light pressure to the roller 27, by means of compression springs 56 acting between frame members 57 and heads 58 on the spindles 55. Greater pressure is applied at intervals to the roller 27 through second compression springs 59 located in caps 60 sliding on the heads 58 of the spindles 55 which ride on cams 61 one of which is carried by the driven shaft 29. The shaft 29 is driven continuously by the main driving means for the whole apparatus. It is coupled through gears 63, 64 to a similar parallel shaft (not visible) situated above the opposite end of the rubber roller 27.

When the cams 61 are not applying extra pressure to the roller 27, the roller 27 bears against a brake shoe 65 urged downwards by a leaf spring 66. In this position therefore the roller 27 cannot rotate but holds the metal foil stationary against the surface of the slotted roller 5. This situation arises during the first part of the intermittent movement of the slotted roller 5. After the roller 5 has moved through a circumferential distance equal to the required spacing between the metal foil strips, the cam 61 reaches a position in which it applies extra pressure to the roller 27, which is sufficient to cause the foil 7 to be driven forward by the continued movement of the slotted roller 5. When this extra pressure is applied the resilience of the rubber roller 27 allows it to be moved downwards to an extent sufficient to free it from the brake shoe 65. On the shafts 29 and the corresponding shaft parallel to it there are second cams 67 which are arranged to depress a cutting knife 68 through levers 69 during the time that the slotted roller 5 is stationary. The knife 68 which extends the whole width of the slotted roller 5 is adapted to cut through the metal foil 7. The cam levers 69 are baised by leaf springs 70.

Figures 7 and 8 show in greater detail the apparatus contained in and associated with the enclosure 18. The condensed strip 42 enters the enclosure through an aperture 71. Also passing through the same wall of the enclosure is a main driving shaft 72 which is rotated at the same speed as the shaft 29 operating the metal foil cutting knife (Figures 1 and 6). On entering the enclosure the condensed strip first passes between two heated sealing bars 43 and 44, normally biased away from the condensed strip by springs 75 and 76 and carried on brackets 77 and 78. Also carried on the brackets 77 and 78 are the pressure plates 45 and 46 carrying the slotted screens 47 and 48. The shape of these screens is more clearly seen from Figure 8. In Figure 8 the nozzles 79 and 80 of the spray guns for applying sprayed metal terminals to the capacitors can be seen. A cam 81 on the shaft 72 and a similar cam 82 on a parallel shaft 83, geared to the shaft 72, urge the two brackets 77 and 78 towards each other during the time when the condensed strip 42 is stationary. During this period the sealing bars 43 and 44 are heated electrically to a temperature high enough to seal all of the folds of the dielectric strips together in a narrow transverse band and, since the slots in the screens 47 and 48 and equivalent screens 84 and 85 on the opposite side of the condensed strip 42 coincide, metal terminals are sprayed on the edges of the condensed strip.

The strip next passes through the main driving rollers 19 and 20 which are intermittently driven from the shaft 72 through gear wheels 86 and 87, the gear wheel 86 being toothed only over half of its periphery. During the time when the rollers 19 and 20 are not being driven they are held stationary by a clicker 88. The rollers 19 and 20 are coupled together by gear wheels 89 and 90. The gear ratio of the roller drive is such that during each revolution of the shaft 72 the rollers drive the condensed strip forward through a distance equal to the length of a capacitor.

Also mounted on the shafts 72 and 83 are cams 91 and 92 which move knife blades 93 and 94 together to sever a capacitor from the condensed strip during the time when the condensed strip is stationary. It will be appreciated that the sealing bars 73 and 74 and the knife blades 93 and 94 are spaced along the composite strip at distances which are multiples of the length of the capacitor. Also the pressure plates are arranged in a position such that the slots in the screens 47 and 48 register with a length of the condensed strip between heat sealed bands.

The construction of the finished capacitor is shown in Figure 9. The electrodes are metal foils 95 and 96, the dielectric consists of dielectric strips 97 and 98, the sprayed terminals are metal masses 99 and 100 and the cover strips for protecting the ends of the capacitors are dielectric strips 101 and 102 of thermoplastic material.

Terminal wires can be attached to the metallised parts of the capacitor by soldering and any further protective casing or covering required applied.

Although the apparatus described above is adapted only to manufacture capacitors having metal foil electrodes, it could be simply modified to manufacture capacitors having electrodes applied by a metallisation process. For this purpose the part of the apparatus to the left of the scoring rolls 11 and 12 (Figure 1) would be replaced by apparatus, similar to that described in our copending application for United Kingdom Letters Patent No. 23,327/53, which is adapted to remove narrow bands of metallisation from completely metallised dielectric strips as they are fed intermittently forward.

A similar wiping device can also be used to remove longitudinal bands of the metallisation coinciding with the inner surfaces of each fold.

Where a thicker dielectric is required further strips of dielectric material can be fed between the strips 1 and 2.

Although it is advantageous to use apparatus of the kind described which is completely automatic, it is possible to eliminate the whole or part of the apparatus to the right of the rollers 13 and 14 (Figure 1) and to seal, spray or cut the condensed strip by hand operations in whatever order is found desirable.

Instead of obtaining adhesion between the folds of the condensed strip by heat sealing they can be held together by any other suitable method, such as riveting or clamping.

What I claim as my invention is:

1. A continuous method of manufacturing electric capacitors which comprises applying conductive layers to the surfaces of a strip of a flexible dielectric material of substantial width, longitudinally feeding the composite strip of dielectric and conductive layers thus formed and simultaneously folding it along a plurality of longitudinal lines parallel to its edges to a zig zag form comprising a plurality of alternating salient and re-entrant angles, thus producing a long narrow strip of folded material, securing the folds at intervals in such a way as to maintain permanently the folded condition, applying terminal connections to the sides of each length between the regions where the folds are secured and dividing the strip by transverse cutting in said regions.

2. A continuous method of manufacturing electric capacitors which comprises forming a composite strip of substantial width by applying conductive layers to one side of each of two strips of flexible dielectric material and assemblying the strips with their surfaces not carrying the conductive layers in contact with each other, longitudinally feeding the composite strip of dielectric and conductive layers thus formed and simultaneously folding it along a plurality of longitudinal lines parallel to its edges to a zig zag form comprising a plurality of alternating salient and re-entrant angles, thus producing a long narrow strip of folded material, securing the folds at intervals in such a way as to maintain permanently the folded condition, applying terminal connections to the sides of each length between the regions where the folds are secured and dividing the strip by transverse cutting in said regions.

3. A continuous method of manufacturing electric capacitors which comprises forming a composite strip of substantial width by applying conductive layers to one side of each of two strips of flexible dielectric material and assembling the strips with their surfaces not carrying the conductive layers separated by at least one strip of dielectric material, longitudinally feeding the composite strip of dielectric and conductive layers thus formed and simultaneously folding it along a plurality of longitudinal lines parallel to its edges to a zig zag form comprising a plurality of alternating salient and re-entrant angles, thus producing a long narrow strip of folded material, securing the folds at intervals in such a way as to maintain permanently the folded condition, applying terminal connections to the sides of each length between the regions where the folds are secured and dividing the strip by transverse cutting in said regions.

4. A continuous method of manufacturing electric capacitors which comprises applying conductive layers in short lengths separated by narrow transverse bands to each of the opposite surfaces of a strip of a flexible dielectric material of substantial width, in such a way that the bands between said lengths on opposite sides of the strip register, leaving narrow margins of the strip bare, longitudinally feeding the composite strip of dielectric and conductive layers thus formed and simultaneously folding it along a plurality of longitudinal lines parallel to its edges to a zig zag form comprising a plurality of alternating salient and re-entrant angles, thus producing a long narrow strip of folded material, securing folds of the dielectric strip together in the narrow transverse bands between the conductive layers in such a way as to maintain permanently the folded condition, applying terminal connections to the sides of the strip between said bands and dividing the strip into short lengths in the region of the bands by transverse cuts.

5. A continuous method of manufacturing electric capacitors which comprises forming a composite strip of substantial width by applying conductive layers in short equal lengths divided by narrow transverse bands to one side of each of two strips of flexible dielectric material and assembling the strips with their surfaces not carrying the conductive layers in contact with each other with the narrow bands registering, longitudinally feeding the composite strip of dielectric and conductive layers thus formed and simultaneously folding it along a plurality of longitudinal lines parallel to its edges to a zig zag form comprising a plurality of alternating salient and re-entrant angles, thus producing a long narrow strip of folded material, securing folds of the dielectric strip together in the narrow transverse bands between the conductive layers in such a way as to maintain permanently the folded condition, applying terminal connections to the sides of the strip between said bands and dividing the strip into short lengths in the region of the bands by transverse cuts.

6. A continuous method of manufacturing electric capacitors which comprises forming a composite strip of substantial width by applying conductive layers in short equal lengths divided by narrow transverse bands to one side of each of two strips of flexible dielectric material and assembling the strips with their surfaces not carrying the conductive layers separated by at least one strip of dielectric material with the narrow bands registering, longitudinally feeding the composite strip of dielectric and conductive layers thus formed and simultaneously folding it along a plurality of longitudinal lines parallel to its edges to a zig zag form comprising a plurality of alternating salient and re-entrant angles, thus producing a long narrow strip of folded material, securing folds of the dielectric strip together in the narrow transverse bands between the conductive layers in such a way as to maintain permanently the folded condition, applying terminal connections to the sides of the strip between said bands and dividing the strip into short lengths in the region of the bands by transverse cuts.

7. A continuous method of manufacturing electric capacitors which comprises applying parallel strips of metal foil of equal width transversely at equal intervals to the opposite surfaces of a strip of a flexible dielectric material of substantial width in such a way that the transverse bands between the strips of metal foil on the opposite surfaces of the dielectric strip register, longitudinally feeding the composite strip of dielectric and conductive layers thus formed and simultaneously folding it along a plurality of longitudinal lines parallel to its edges to a zig zag form comprising a plurality of alternating salient and re-entrant angles, thus producing a long narrow strip of folded material, securing the folds of the dielectric strip between the strips of metal foil in such a way as to maintain permanently the folded condition, applying terminal connections to the exposed metal foil at the sides of the composite strip and dividing the strip into short lengths by transverse cuts between the strips of metal foil.

8. A continuous method of manufacturing electric capacitors which comprises applying parallel strips of metal foil of equal width transversely at equal intervals to one surface of each of two strips of flexible dielectric material of substantial width, assembling the strips with their surfaces not carrying the foil in contact and the strips of foil registering, longitudinally feeding the composite strip of dielectric and conductive layers thus formed and simultaneously folding it along a plurality of longitudinal lines parallel to its edges to a zig zag form comprising a plurality of alternating salient and re-entrant angles, thus producing a long narrow strip of folded material, securing the folds of the dielectric strip between the strips of metal foil in such a way as to maintain permanently the folded condition, applying terminal connections to the exposed metal foil at the sides of the composite strip and dividing the strip into short lengths by transverse cuts between the strips of metal foil.

9. A continuous method of manufacturing electric capacitors which comprises applying conductive layers in short equal lengths divided by narrow bands to each of the exposed surfaces of a strip of a flexible heat-sealable dielectric material of substantial width, in such a way that the bands between the conductive layers on the opposite sides of the strip register, leaving narrow margins of the strip bare, longitudinally feeding the composite strip of dielectric and conductive layers thus formed and simultaneously folding it along a plurality of lines parallel to its edges to a zig zag form comprising a plurality of alternating salient and re-entrant angles, thus producing a long narrow strip of folded material, securing the folds of the dielectric strip together by locally heating the dielectric material in the narrow bands between the conductive layers in such a way as to maintain permanently the folded condition, applying terminal connections to the sides of the composite strip between the bands by metal spraying and dividing the strip by transverse cuts in the region of the bands into short lengths.

10. A continuous method of manufacturing electric capacitors which comprises applying conductive layers in short equal lengths divided by narrow bands to the exposed surfaces of a number of superposed strips of a flexible heat-sealable dielectric material of substantial width, in such a way that the bands on the opposite sides of the strip register, leaving narrow margins of the strip bare, longitudinally feeding the composite strip of dielectric and conductive layers thus formed and simultaneously folding it along a plurality of longitudinal lines parallel to its edges to a zig zag form comprising a plurality of alternating salient and re-entrant angles, thus producing a long narrow strip of folded material, securing the folds of the dielectric strip together by locally heating the dielectric material in the narrow bands between the conductive layers in such a way as to maintain permanently the folded condition, applying terminal connections to the sides of the composite strip between the bands by metal spraying and dividing the strip by transverse cuts in the region of the bands into short lengths.

11. A continuous method of manufacturing electric capacitors which comprises intermittently feeding forward simultaneously in equal steps two strips of flexible dielectric material of substantial width, during the forward movement of the strip applying parallel strips of metal foil of equal width transversely at equal intervals to the surfaces of each strip, continuously assembling the strips with their surfaces not carrying the foil in contact and the strips of foil registering and continuously folding the composite strip of dielectric and conductive layers thus formed along a plurality of longitudinal lines parallel to its edges to a zig zag form comprising a plurality of salient and re-entrant angles, thus producing a long narrow strip of folded material, and while the condensed strip is stationary carrying out the following operations, at intervals along its length; applying heat sealing means in the region of the transverse bands, applying terminals by metal spraying to the edges of the condensed strip between heat sealed regions and severing the folded strip, in the region where it is heat sealed, into capacitor lengths.

References Cited in the file of this patent

UNITED STATES PATENTS

| | | |
|---|---|---|
| 2,565,301 | Foster et al. | Aug. 21, 1951 |
| 2,727,297 | Fralish et al. | Dec. 20, 1955 |

FOREIGN PATENTS

| | | |
|---|---|---|
| 270,972 | Switzerland | Jan. 3, 1951 |
| 684,529 | Great Britain | Dec. 17, 1952 |
| 903,040 | France | Sept. 21, 1945 |